United States Patent [19]

Mann et al.

[11] Patent Number: 5,587,000
[45] Date of Patent: Dec. 24, 1996

[54] TAKEOUT MECHANISM IN GLASSWARE FORMING MACHINE

[75] Inventors: Philip A. Mann, Pontefract; Ian Green, Dore, both of United Kingdom

[73] Assignee: Emhart Glass Machinery Investments Inc., Wilmington, Del.

[21] Appl. No.: 353,843

[22] Filed: Dec. 12, 1994

[30] Foreign Application Priority Data

Dec. 16, 1993 [GB] United Kingdom ............... 9325748

[51] Int. Cl.⁶ ............................................. C03B 9/44
[52] U.S. Cl. ........................ 65/260; 65/239; 65/241; 65/375; 414/731; 414/733
[58] Field of Search ............................ 65/171, 260, 375, 65/239, 241; 414/731, 733

[56] References Cited

U.S. PATENT DOCUMENTS

| | | | |
|---|---|---|---|
| 3,175,702 | 3/1965 | Banyas | 65/260 |
| 3,401,029 | 9/1968 | Roberts | 65/260 |
| 4,494,973 | 1/1985 | Perry | 65/260 |
| 4,525,195 | 6/1985 | Foster | 65/260 |
| 5,271,757 | 12/1993 | Houben et al. | 65/239 |
| 5,346,525 | 9/1994 | Vajda et al. | 65/260 |

*Primary Examiner*—Jill Warden
*Assistant Examiner*—Long V. Le
*Attorney, Agent, or Firm*—Spencer T. Smith

[57] ABSTRACT

A method of adjusting the height of the takeout mechanism in a glassware forming machine comprises setting a takeout arm of the mechanism at a predetermined angle by use of a jig member adjusting a piston and cylinder device so that it is in a predetermined lowermost position when the takeout arm is so set, using a second jig member appropriate to the desired height of the takeout mechanism with respect to a set of moulds, setting the whole mechanism to the appropriate height and adjusting a scale to indicate the height to which the mechanism is set.

2 Claims, 1 Drawing Sheet

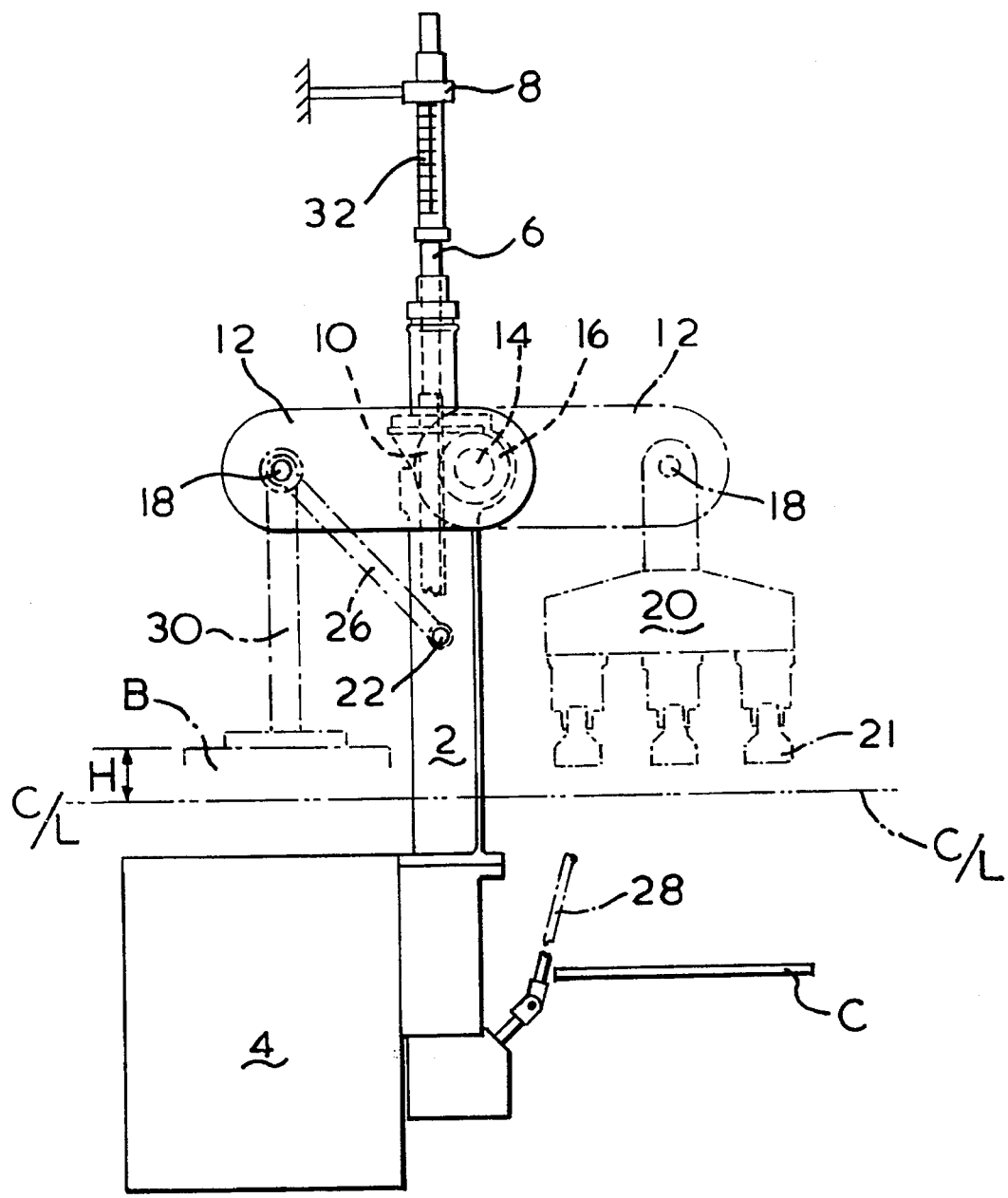

TAKEOUT MECHANISM IN GLASSWARE FORMING MACHINE

This invention is concerned with a method of setting up a takeout mechanism in a glassware forming machine.

BACKGROUND TO THE INVENTION

In glassware forming machines of the I.S. type, a gob of molten glass is supplied to a parison mould in which it is formed into a parison. It is then transferred by an invert mechanism from the parison mould to a blow mould in which it is blown into the shape of a container. The blown container is then removed from the blow mould to a cooling plate by a takeout mechanism. From the cooling plate the container is pushed out onto a conveyor by which it is removed from the machine.

A takeout mechanism comprises a housing which is secured in a table of the glassware forming machine and comprises an upward extension which is supported in a bracket of the forming machine to assist in stabilizing the mechanism. The take out mechanism comprises a piston and cylinder device in the housing, a rack connected to the piston, a takeout arm pivoted on the housing and linked to the rack by a gear, the arm having a pivot point from which a takeout head may be supported.

In the operation of the mechanism, the arm is moved to bring the takeout head over the blow moulds by operation of the piston and cylinder to move the rack. The takeout head is then caused to grip the containers in the blow moulds, the rack operates to cause the arm to rotate through 180° to carry the container away from the blow moulds into position over the cooling plate and the containers are released.

It will be understood that it is very important to have the takeout head accurately positioned with respect to the blow mould so that the finishes of the formed containers are properly gripped by fingers of the takeout head. Different sets of moulds may be of different heights—the significant measurement is the invert height, which is the distance between the upper surface of the blow moulds in position in the machine and a horizontal plane passing through the axis of the invert mechanism. Different moulds have different invert heights.

The present method of setting up take out mechanisms comprises the following steps:

1 The operator adjusts a stop which is at the lower end of the piston and cylinder device to bring the takeout arm into a horizontal position, as judged by eye.
2 The operator then adjusts the position of the mechanism as a whole to bring the fingers of the takeout head into the correct position over the blow mould.

If a new set of moulds is to be used, these steps have to be repeated, and the second step, in particular, is somewhat time consuming and relies to a great extent on the operators judgement.

It is one of the objects of the present invention to provide an improved method of setting up a takeout mechanism.

BRIEF STATEMENT OF THE INVENTION

The present invention provides a method of setting up a take out mechanism in a glassware forming machine, which machine comprises a machine frame, a set of blow mould members having a known invert height mounted in said machine frame and support means extending above said machine frame, said take out mechanism comprising;

a vertically extending housing which is secured in said machine frame and which comprises an upward extension secured to said support means a piston and cylinder device in said housing a stop at the lower end of said piston and cylinder which determines the lowermost position of the piston in said device a rack in said housing connected to said piston and cylinder device a takeout arm pivoted on said housing and linked to said rack by gear means a takeout head pivoted on said takeout arm at a pivot point takeout tongs depending from said takeout head wherein a reference boss is provided on said housing, the method comprising (i) positioning a first jig member between said reference boss and said pivot point to ensure said takeout arm is at a predetermined angle to the housing;

(ii) adjusting said stop at the lower end of said piston and cylinder device to ensure that when said takeout arm is at the predetermined angle said piston cannot move further downwards;

(iii) removing said first jig member and replacing it by a second jig member selected according to the desired height of said takeout tongs above the mould members for the correct pickup of formed containers from the set of mould members, said second jig member depending from said pivot point of said arm;

(iv) adjusting the position of said housing in the machine frame so that said second jig member contacts the upper surface of the set of blow mould members in the machine and fixing said housing in such position; and (v) adjusting a scale on said upward extension so that the scale reads a value equivalent to the invert height of the mould members.

BRIEF DESCRIPTION OF THE DRAWING

The invention will now be described with reference to the accompanying drawings in which:

FIG. 1 shows, diagrammatically, a takeout mechanism.

DESCRIPTION OF PREFERRED METHOD OF PERFORMING THE INVENTION

The takeout mechanism is incorporated in a glassware forming machine which comprises a machine frame 4, and a set of blow mould members B. The blow mould members B have a known invert height h, being the distance between the upper surface of the mould members B and the centre line of the invert mechanisms (not shown) indicated at C/L. The glassware forming machine also comprises support means in the form of a bracket 8 which extends above the frame 4.

The take out mechanism (FIG. 1) comprises a vertically extending housing 2 which is secured in the machine frame 4. The housing 2 comprises an upward extension 6 which is supported by the bracket 8 of the machine to assist in stabilising the takeout mechanism.

The mechanism comprises a piston and cylinder device (not shown) in the housing 2 and a stop (not shown) at the lower end of the piston and cylinder device which determines the lowermost position of the piston in the device. An adjusting rod 28 is provided for adjusting the position of the stop. A rack 10 is connected to the piston of the piston and cylinder device. A takeout arm 12 is pivoted on the housing 2 at 14 and is linked to the rack by a gear means comprising a gear 16. The arm 12 has a pivot point 18 from which a takeout or a tong head 20 (shown only in dotted line) is suspended. Takeout tongs 21 depend from the takeout head 20. A reference boss 22 is provided on the housing 2.

In the operation of the takeout mechanism the arm 12 is first moved to bring the takeout head 20 over the blow moulds (indicated diagrammatically at B) by operation of the piston and cylinder device. The tongs of the takeout head 20 are then caused to grip the containers in the blow moulds, the rack 10 then operates to cause the arm 12 to rotate through 180° to the position shown in dotted lines, to carry the formed containers away from the blow moulds B into position over a cooling plate C.

To set up the takeout mechanism an operator follows the following steps:

(i) The operator positions a first jig member 26 between the reference boss 22 and the pivot point 18 with the takeout head over the blow moulds. This ensures that the arm 12 is at a predetermined angle, specifically 90°, to the housing (ii) The operator, by adjusting the rod 28 adjusts the position of the stop (not shown) at the lower end of the piston and cylinder device to determine that when the arm 12 is at the predetermined angle the piston cannot move further downwards.

(iii) The operator removes the first jig member and replaces it by a second jig member 30 depending from the pivot point 18. The second jig member 30 is of a size appropriate to determine the correct height of the takeout tongs over the blow moulds for the correct pickup of the bottles from the blow moulds.

(iv) The operator then adjusts the height of the takeout mechanism in the machine frame 4 so that the second jig member 30 lies across the upper surface of the blow moulds B and in contact with that surface, and then, and locks the mechanism in position.

(v) The operator adjusts a scale 32 movably mounted on the extension 6 so that a reading taken at the bracket 8 indicates the invert height h of the blow moulds and locks the scale 32 in position. The scale 32 is graduated in millimeters.

If at a later time a set of moulds with a different invert height h2 is to be used in the machine, the operator merely has to adjust the height of the takeout mechanism in the table 4 so that the scale 32 reads the new height h2. No further adjustment is necessary.

Formerly when a set of moulds of different height was put into the machine the complete procedure for setting up the takeout mechanism had to be repeated.

We claim:

1. A method of setting up a take out mechanism in a glassware forming machine comprising a machine frame, a set of blow mould members having an upper surface and having a known invert height mounted in said machine frame, support means extending above said machine frame, and a take out mechanism comprising:

a vertically extending housing which is secured in said machine frame and which includes an upward extension secured to said support means, a piston and cylinder device in said housing having upper and lower ends, the piston displaceable between upper and lower positions, a stop at the lower end of said piston and cylinder which determines the lower position of the piston in said device, a rack in said housing connected to said piston and cylinder device, a take out arm pivoted on said housing and linked to said rack by gear means, a take out head pivoted on said take out arm at a pivot point, take out tongs depending from said take out head, the pivotal displacement of the take out arm displacing the take out tongs from a lower position for picking up formed containers to an upper position and wherein a reference boss is provided on said housing, the method comprising (i) positioning a first jig member between said reference boss and said pivot point to ensure said take out arm is at a predetermined angle to the housing;

(ii) adjusting said stop at the lower end of said piston and cylinder device to ensure that when said take out arm is at the predetermined angle said piston cannot move further downwards;

(iii) removing said first jig member from the pivot point of the arm and from the reference boss and replacing it with a second jig member selected for the lower position of said take out tongs, said second jig member placed on the pivot point of the arm and freely depending from said pivot point of said arm;

(iv) adjusting the position of said housing in the machine frame so that said second jig member contacts the upper surface of the set of blow mould members in the machine and fixing said housing in such position; and (v) adjusting a scale on said upward extension so that the scale reads a value equivalent to the invert height of the mould members.

2. A method according to claim 1 wherein the predetermined angle is 90°.

* * * * *